United States Patent Office 3,501,573
Patented Mar. 17, 1970

3,501,573
METHOD FOR LOWERING SERUM LIPID CONCENTRATION
Ake John Erik Helgstrand, Berndt Olof Harald Sjoberg, and Nils Erik Stjernstrom, Sodertalje, Sweden, assignors to Aktiebolaget Astra, Sodertalje, Sweden, a corporation of Sweden
No Drawing. Original application Jan. 12, 1967, Ser. No. 608,932. Divided and this application Mar. 7, 1969, Ser. No. 805,372
Int. Cl. A61k 27/00
U.S. Cl. 424—273          1 Claim

ABSTRACT OF THE DISCLOSURE

The use of the compound of the formula

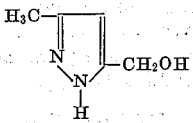

or a therapeutically acceptable salt thereof for lowering of excessive serum lipid concentrations.

---

This invention relates to a method for lowering excessive serum lipid concentrations in man. This is a divisional application of application Ser. No. 608,932, filed Jan. 12, 1967. More particularly, the present invention relates to a method for lowering excessive serum lipid concentrations in man, comprising the administration to a host of a therapeutically effective amount of a compound of the formula

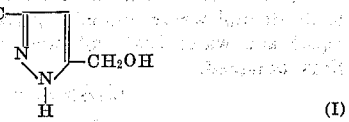

or a non-toxic acid addition salt thereof. The compound of the Formula I and its non-toxic addition salts are valuable for lowering excessive serum lipid concentrations in man.

In view of accumulating evidence indicating that excessive serum lipid concentration is correlated to basic pathogenetic mechanisms and to symptoms of several diseases such as vascular diseases, diabetes mellitus, and hyperthyroidism, lowering of serum lipid concentration is important during treatment of such diseases.

The lowering of serum lipid concentration may be obtained by inhibition of lipid mobilization, e.g. by a decrease in the net release of lipids to the circulation, in the form of free fatty acids, from stored triglycerides in adipose tissue.

Typical non-toxic addition salts of the compound of the Formula I include but are not limited to the salts of mineral acids, such as hydrochloric, hydrobromic, phosphoric or sulphuric acid, organic acids such as acetic, glycolic, lactic, levulinic, citric, fumaric, maleic, succinic, tartaric, benzoic acid and sulphonic acids, such as methanesulphonic acid and sulphamic acid.

The compound of the Formula I may be prepared by reduction of a compound of the formula

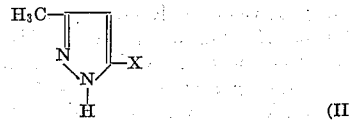

or a salt thereof, wherein X is a formyl, carboxy, chlorocarbonyl, alkoxycarbonyl, thiolester

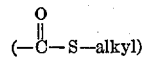

or a cyano group, by methods known to be applicable to the reduction of analogous compounds, for example catalytical hydrogenation and reduction by means of complex metal hydrides, to the formation of the compound of the Formula I and, where a non-toxic addition salt is required, reacting said compound with the appropriate acid.

According to a preferred embodiment a compound of the Formula II, wherein X is an alkoxycarbonyl group of at most 5 carbon atoms, is reduced by means of complex metal hydrides, such as lithium aluminum hydride, sodium or potassium borohydride.

In cases when lithium aluminum hydride is used as the reducing agent, the reaction is preferably performed in inert solvents such as diethyl ether or tetrahydrofuran. In clinical practice the compounds of the present invention will normally be administered orally, or rectally or by injection in the form of pharmaceutical preparations comprising the active ingredient in the form of the free base or a pharmaceutically acceptable salt thereof, e.g. the hydrochloride, in association with a pharmaceutically acceptable carrier which may be a solid, semi-solid or liquid diluent or an ingestible capsule, and such preparations comprise a further aspect of the invention. Usually the active substance will comprise between 0.1 and 95% by weight of the preparation, for example, between 0.5 and 20% for preparations intended for injection and between 0.1 and 50% for preparations intended for oral administration.

To produce pharmaceutical preparations in the form of dosage units for oral application containing a compound of the invention in the form of the free base, or a pharmaceutically acceptable salt thereof, the active ingredient may be mixed with a solid, pulverulent carrier, for example lactose, saccharose, sorbitol, mannite, a starch such as potato starch, corn starch, amylopectin, laminaria powder or citrus pulp powder, a cellulose derivative or gelatine, and also may include lubricants such as magnesium or calcium stearate or a Carbowax® or other polyethylene glycol wax and compressed to form tablets or centres for dragees. If dragees are required, the centres may be coated, for example with concentrated sugar solutions which may contain gum arabic, talc and/or titanium dioxide, or alternatively with a lacquer dissolved in easily volatile organic solvents or mixtures of organic solvents. Dyestuffs can be added to these coatings, for example, to distinguish between different contents of active substance. For the preparation of soft gelatin capsules (pearl-shaped closed capsules) consisting of gelatin and, for example, glycerin, or similar closed capsules, the active substance may be admixed with a Carbowax®. Hard gelatin capsules may contain granulates of the active substance with solid, pulverulent carriers such as lactose, saccharose, sorbitol, mannite, starches (for example potato starch, corn starch or amylopectin), cellulose derivatives or gelatin, and may also include magnesium stearate or stearic acid. Dosage units for rectal application may be in the form of suppositories comprising the active substance in admixture with a neutral fatty base, or gelatin rectal capsules comprising the active substance in admixture with a Carbowax® or other polyethylene glycol wax.

Liquid preparations for oral application may be in the form of syrups or suspensions, for example solutions containing from about 0.1% to 20% by weight of active substance, sugar and a mixture of ethanol, water, glycerine, propyleneglycol and, optionally, aroma, saccharine and/or carboxymethylcellulose as a dispersing agent.

For parenteral application by injection preparations may comprise an aqueous solution of a water soluble pharmaceutically acceptable salt of the active substance desirably in a concentration of 5.1–10%, and optionally also a stabilising agent and/or buffer substance in aqueous solution. Dosage units of the solution may advantageously be enclosed in ampoules.

If administered by mouth the compound may be given repeatedly in doses up to totally 2 g./day.

The following examples illustrate the invention:

EXAMPLE 1

5-methyl-3-pyrazolementhanol

Ethyl 5-methyl-3-pyrazolecarboxylate (50.0 g.) was continually extracted into a refluxing solution of lithium aluminum hydride (25.0 g.) in 2 l. of anhydrous diethyl ether over a period of 2 days using a Soxhlet apparatus. The excess of hydride was destroyed with ethyl acetate (redistilled) and the mixture refluxed for 1 hour. To the cooled mixture 200 ml. of a saturated aqueous solution of sodium sulphate was added and the mixture extracted with 6 portions (500 ml.) of diethyl ether. The ether solution was dried over anhydrous sodium sulphate, filtered and the solvent evaporated in vacuo to give 43 g. oily product. Trituration of this product with benzene and ligroin gave 20 g. crystalline product, M.P. 80–82° C. Further extraction of the inorganic salts obtained from the quenched reaction mixture gave another 3.0 g. of the same product, M.P. 80–82° C. Total yield 65%.

*Analysis.*—Calculated for (percent): $C_5H_8N_2O$: C, 53.33; H, 7.19; N, 24.99; O, 14.27. Found (percent): C, 53.43; H, 7.01; N, 24.88; O, 14.48.

The starting material, ethyl 5-methyl-3-pyrazolecarboxylate, was prepared according to L. Knorr and J. Macdonald Ann. d. Chem. 279 (1894) 219.

EXAMPLE 2

Pharmacological tests

The compound according to the invention was tested with regard to lowering the concentration of free fatty acids in serum of dogs according to the method described by Carlsson, L. A. and Liljedahl, S. O. Acta Med. Scand. 173 (1963) 787–791, and Bergström, S., Carlsson, L .A. and Orö, L. Acta Physiol. Scand. 60 (1964), 170–180. In this method, the compound is tested on a model for the stress situation, in which noradrenaline stimulated lipid mobilization is known to occur.

Anaesthetized dogs were given intravenous infusions of noradrenaline (0.5 mcg./kg. bodyweight and min.). The test substance of Formula I (25 mg./kg. bodyweight) was injected intravenously 60 min. after the start of infusion. The arterial level of free fatty acids as a function of time was followed. The maximum depression $a$, of free fatty acid serum concentration is 100% of the total rise in free fatty acid serum concentration induced by the continuous intravenous infusion of noradrenaline. The duration $b$, of more than 50% depression of free fatty acid serum concentration is more than 3 hours and the level $c$, 3 hours after the injection of the compound of Formula I is still 90% lower than the original level induced by the noradrenaline infusion. The corresponding values of $a$, $b$ and $c$ for the reference compound nicotinic acid are 108%, 88 minutes respectively 31% higher than the original level induced by the noradrenaline infusion (the values given are average values from 17 experiments; sample standard deviations are ±9%, ±24 minutes and ±43%).

The compound of the invention has a low toxicity. Upon i.p. administration in mice the toxicity given as the $LD_{50}$-value was found to be:

2 g./kg. mice $>LD_{50}>$1 g./kg. mice

The following examples illustrate how the compounds of the instant invention can be incorporated in pharmaceutical compositions.

EXAMPLE 3

Preparation of soft gelatin capsules 500 g. of active substance were mixed with 500 g. of corn oil whereafter the mixture was filled in soft gelatin capulses, each capsule containing 100 mg. of mixture (i.e. 50 mg. of active substance).

EXAMPLE 4

Preparation of soft gelatin capsules 500 g. of active substance were mixed with 750 g. of peanut oil whereafter the mixture was filled in soft gelatin capsules, each capsule containing 125 mg. of mixture (i.e. 50 mg. of active substance).

EXAMPLE 5

Preparation of tablets 50 kg. of active substance were mixed with 20 kg. of silicon dioxide of the trademark Aerosil, whereafter 45 kg. of potato starch and 50 kg. of lactose were mixed in and the mixture moistened with a starch paste prepared from 5 kg. of potato starch and distilled water, whereafter the mixture was granulated through a sieve. The granulate was dried and sieved whereafter 2 kg. of magnesium stearate were mixed in. Finally the mixture was pressed into tablets, each weighing 172 mg.

EXAMPLE 6

Preparation of an emulsion 100 g. of active substance were dissolved in 2,500 g. of peanut oil. From the solution thus obtained 90 g. of gum arabic, aroma and colour (q.s.) and 2,500 g. of water an emulsion was prepared.

EXAMPLE 7

Preparation of a syrup 100 g. of active substance were dissolved in 300 g. of 95% ethanol where 300 g. of glycerol, aroma and colour (q.s.) and water 1,000 ml. were mixed in. A syrup was thus obtained.

EXAMPLE 8

Preparation of a solution 100 g. of active substance were dissolved in 2,000 g. of polyoxyethylene sorbitan monooleate, whereafter aroma and colour (q.s.) and water to 5,000 ml. were mixed in. A drop solution was thus obtained.

EXAMPLE 9

Preparation of a syrup containing vitamins

The syrup was prepared from the following ingredients:

active substance—7.0 g.
polyoxyethylenesorbitol monooleate—0.4 g.
vitamin A—12,000 IE
vitamin C—2 g.
vitamin $B_1$—50 mg.
vitamin $B_2$—70 mg.
vitamin $B_6$—10 mg.
pantothenol—100 mg.
caffeine—300 mg.
sorbitol—20 mg.
aroma, colour, q.s.
Water to 100 ml.

Vitamin A was dissolved in the polyoxyethylene sorbitan monoleate while heating to about 60° C., whereafter 20 ml. of water was mixed in. The caffeine was dissolved in 10 ml. of water, while heating to about 90° C. The remaining ingredients were mixed in about 60 ml. of water, whereafter the vitamin A and caffeine solutions were added while stirring. The pH was adjusted to 4.5–5.5 by addition of sodium hydroxide solution and the syrup made up to 100 ml. with water. The whole procedure was carried out in nitrogen atmosphere. A normal dose is contained in 15 ml. of the syrup.

EXAMPLE 10

Preparation of effervescent tablets 100 g. of active substance was mixed with 300 g. of acid, 110 g. of finely divided sodium hydrogen carbonate, 3.5 g. of magnesium stearate and aroma (q.s.) were mixed and the mixture was pressed into tablets, each containing 100 mg. of active substance.

EXAMPLE 11

Preparation of a drop solution 100 g. of active substances were mixed with 300 g. of ethanol, whereafter 300 g. of glycerol, water to 1,000 ml., aroma and colour (q.s.) and 0.1 N sodium hydroxide solution (to pH 4.5–5.5) were added while stirring. A drop solution was thus obtained.

EXAMPLE 12

Preparation of a sustained release tablet 200 g. of active substance were melted together with 50 g. of stearic acid and 50 g. of carnauba wax. The mixture thus obtained was cooled and ground to a particle size of at most 1 mm. (diameter). The mass thus obtained was mixed with 5 g. of magnesium stearate and pressed into tablets each weighing 305 mg. Each tablet thus contains 200 mg. of active substance.

We claim:

1. A method for lowering excessive serum lipid concentration which comprises administering to a host in need of such treatment the compound having the formula

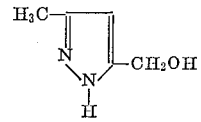

or a pharmaceutically acceptable salt thereof in a serum lipid lowering effective dose.

References Cited

Jones et al.: Jour. Org. Chem., vol. 19, pp. 1428–1434 (1954).

ALBERT T. MEYERS, Primary Examiner

J. D. GOLDBERG, Assistant Examiner

PO-1050
(5/69)

UNITED STATES PATENT OFFICE
CERTIFICATE OF CORRECTION

Patent No. 3,501,573     Dated March 17, 1970

Inventor(s) Ake John Erik Helgstrand et al.

It is certified that error appears in the above-identified patent and that said Letters Patent are hereby corrected as shown below:

Column 5, line 3, should read -- 100 g. of active substance, 140 g. of finely divided citric --;

Column 5, line 10, change "substances" to -- substance --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents